United States Patent [19]

Rademacher et al.

[11] Patent Number: 4,941,165
[45] Date of Patent: Jul. 10, 1990

[54] HOT CUT PROCEDURE FOR TELECOMMUNICATIONS NETWORK

[75] Inventors: Kevin A. Rademacher, Lakeville; Dennis R. Dean, Eden Prairie; Jerry L. Dixon, Sr., Burnsville; Robert J. Szklarz, Richfield, all of Minn.

[73] Assignee: ADC Telecommunications, Inc., Minneapolis, Minn.

[21] Appl. No.: 374,076

[22] Filed: Jun. 29, 1989

[51] Int. Cl.$^5$ .................................................. H04B 3/50
[52] U.S. Cl. ............................................ 379/1; 379/457
[58] Field of Search ...................... 379/1, 25, 21, 326, 379/327, 397, 457; 370/13

[56] References Cited

U.S. PATENT DOCUMENTS

3,975,600  8/1976  Marston ................................. 379/21

Primary Examiner—Stafford D. Schreyer
Attorney, Agent, or Firm—Merchant, Gould, Smith, Edell, Welter & Schmidt

[57] ABSTRACT

In a telecommunication network, having at least first and second original equipment electrically connected by at least a first existing conductor, a method is disclosed for adding intermediate equipment to the network. The intermediate equipment is connected to the first original equipment by at least a first replacement conductor and the intermediate equipment is connected to the second original equipment by at least a second replacement conductor. A method for adding uses a temporary circuit having at least first and second test conductors. The method includes the steps of electrically connecting first and second replacement conductors to the additional equipment. The first temporary conductor is electrically connected to the original conductor at a first point of connection. The second temporary conductor is electrically connected to the original conductor at a second point of connection. The second point of connection is disposed between the second original equipment and the first point of connection. The first and second temporary conductors and the first original conductor cooperate to define a temporary signal pathway between the first and second original equipment with the temporary signal pathway including the high temporary circuit. The original conductor is severed at a point of severance disposed between the first and second points of connection. The first replacement conductor is electrically connected to the first original equipment. The second replacement conductor is electrically connected to the second original equipment. The temporary signal pathway is severed.

12 Claims, 7 Drawing Sheets

HOT CUT PROCEDURE FOR TELECOMMUNICATIONS NETWORK

BACKGROUND OF THE INVENTION

1. Field of the Invention

This invention pertains to a telecommunications network. More particularly, this invention pertains to a method for adding equipment to a telecommunications network without the need for interrupting signal transmission within the network.

2. Description of the Prior Art

In a telecommunications network, existing equipment is frequently connected in series. For example, a piece of originating equipment may be connected to a piece of terminating equipment via digital signal cross-connect (DSX) equipment. In such a network, the equipment is connected through paired electrical conductors commonly referred to as tip and ring conductors.

From time to time, it is desirable to replace a piece of existing equipment or to insert new equipment into the network. Historically, this would require severing existing signal pathways. The severing would result in down time for the equipment or the breaking of transmission within the network. It is desireable to provide a procedure (known as a "hot cut" procedure) for reconnecting network equipment with zero circuit down time.

SUMMARY OF THE INVENTION

A method is provided for adding additional equipment to a telecommunications network. The network has at least first and second original equipment which are connected by at least a first original conductor. The method is performed using a temporary circuit having at least first and second temporary conductors. The temporary circuit provides a resistively dropped signal carried through a bridging office repeater to regenerate a low level signal. The method includes the steps of electrically connecting first and second replacement conductors to the additional equipment. The first temporary conductor is connected to the original conductor at a first point of connection. The second temporary conductor is connected to the original conductor at a second point of connection located between the second original equipment and the first point of connection. The first and second temporary conductors and the first original conductor cooperate to define a temporary signal pathway between the first and second original equipment. The temporary signal pathway includes the temporary circuit. The original conductor is severed at a point of severance disposed between the first and second points of connection. The first replacement conductor is electrically connected to the first original equipment. The second replacement conductor is electrically connected to the second original equipment and the temporary signal pathway is severed.

DESCRIPTION OF THE PREFERRED EMBODIMENT

A. NETWORKS FOR USING THE PRESENT METHOD

Figure 1:
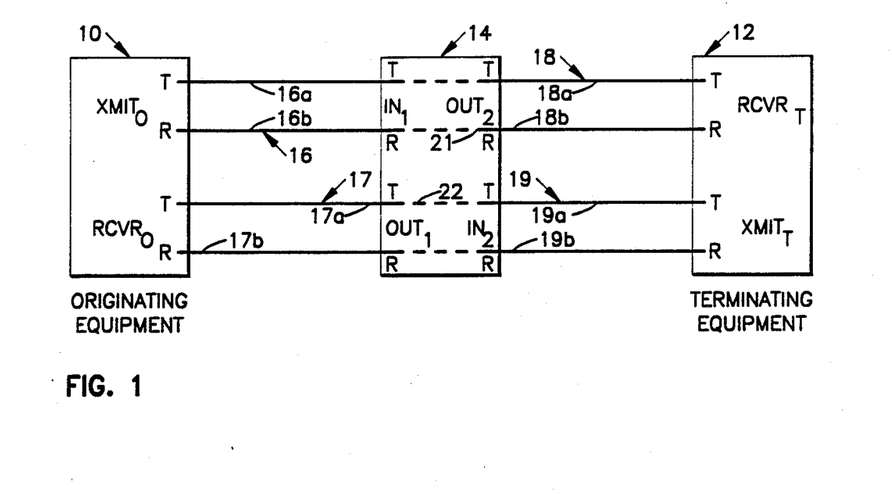
FIG. 1 is a schematic representation of a telecommunications network showing originating equipment, a mechanical DSX equipment and terminating equipment connected in series through pairs of tip and ring conductors.

With reference now to the various figures in which identical elements are numbered identically throughout, a description of the present invention will now be described with reference to a preferred embodiment. In FIG. 1, a telecommunications network is shown. The network includes a piece of originating equipment 10 such as a D4 channel bank and terminating equipment 12 such as a digital switch DS-1 port (DTC). Intermediate equipment 14, such as a mechanical digital signal cross connect (DSX), is provided disposed between the originating equipment 10 and the terminating equipment 12.

As shown in FIG. 1, the originating equipment 10, terminating equipment 12 and manual DSX 14 are connected by existing pairs 16–19 of conductors. Each pair 16–19 includes a tip conductor 16a–19a and ring conductor 16b–19b, as is conventional.

Each of equipments 10, 12 and 14 include attachment locations (such as wire wrap termination pins or the like) for terminating the conductors 16a–19a on the equipment 10, 12, 14. For ease of illustration, tip conductors 16a–19a are shown terminated at tip termination locations, T. Similarly, ring conductors 16b–19b are shown terminated at ring termination locations, R.

The originating equipment 10 may include a plurality of tip and ring transmitting pairs (only one of which is shown at $XMIT_O$). Also, the originating equipment may include a plurality of receiving tip and ring pairs (only one of which is schematically shown at $RCVR_O$). Similarly, the terminating equipment 12 may include a plurality of receiving and transmitting tip and ring pairs (only one of each being schematically shown at $XMIT_T$ and $RCVR_T$, respectively). The transmitting pairs ($XMIT_O$) of the originating equipment 10 are electrically connected to the receiving pair ($RCVT_T$) of the terminating equipment 12 via original conducting tip and ring conductors pairs 16 and 18. Similarly, the receiving tip and ring pairs ($RCVR_O$) of the originating equipment 10 are connected to the tip and ring transmitting pairs ($XMIT_T$) of the terminating equipment 12 via original conductor pairs 17 and 19.

Disposed in the network in series between the originating equipment and the terminating equipment is the manual DSX 14. In the schematic showing of FIG. 1, opposite sides of the manual DSX include incoming tip and ring pairs (shown schematically as $IN_1$ and $IN_2$) and outgoing tip and ring pairs (shown schematically as $OUT_1$ and $OUT_2$). The $IN_1$ tip and ring pairs of the manual DSX are cross-connected to the $OUT_2$ tip and ring pairs by internal spring contacts and cross-connect wires 21 (shown schematically in phantom lines). Similarly, the $OUT_1$ tip and ring pairs are connected to the $IN_2$ tip and ring pairs by internal spring contacts and cross-connect wires 22.

From time to time, it is desirable to add equipment to a telecommunications network or to replace existing equipment. For example, in the network shown in FIG. 1, it may be desirable to replace the manual DSX 14 with an electronic DSX. One way to accomplish this substitution is to simply sever conductor pairs 16–19 and replace the manual DSX 14 with an electronic DSX. However, the act of severing the conductors 16–19 results in termination of signals through the network. The present invention is for a hot cut method of installation of new equipment whereby signal transmission between the originating equipment and the terminating equipment is not interrupted while new equipment (such as an electronic DSX) is being inserted into the network.

B. THE METHOD OF THE PRESENT INVENTION

1. Installation Of New Equipment

Figure 2:
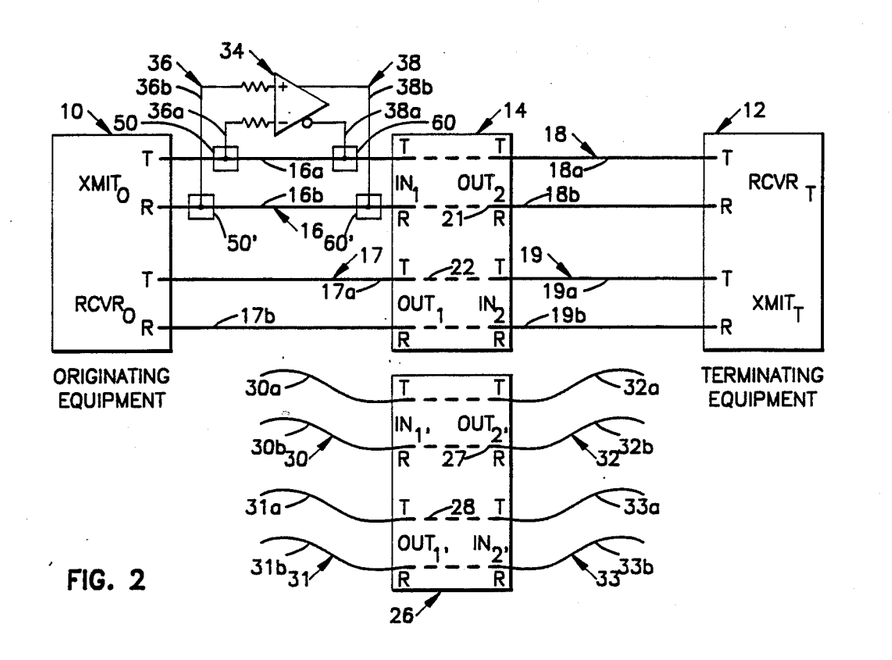
FIG. 2 is the view of FIG. 1 with a high impedance circuit added to one pair of the tip and ring conductors of FIG. 1 and showing an electronic DSX to be added to the network.

With reference to FIG. 2, an additional piece of equipment (such as an electronic DSX) is shown schematically at 26. Like the manual DSX 14, electronic DSX 26 includes a plurality of tip and ring pairs ($IN_1$, $IN_2$, $OUT_1$, $OUT_2$) with internal circuitry 27 connecting the $IN_1$ tip and ring pairs of one side with the $OUT_2$ tip and ring pairs. Circuitry 28 connecting the $IN_2$ pairs with the $OUT_1$ pairs.

2. Installation Of New Conductors

In the method of the present invention, the electronic DSX is physically installed in its desired location in the physical plant and tested. After installation of the electronic DSX 26, a first replacement conductor pair 30 (including first replacement tip conductor 30a and first replacement ring conductor 30b) is run between the originating equipment 10 and the electronic DSX 26. Similarly, a second replacement conductor pair 32 (including second replacement tip conductor 32a and second replacement ring conductor 32b) is run between the terminating equipment 12 and the electronic DSX 26. The tip and ring conductors 30a and 30b are terminated on the $IN_1$ wire wrap pins (T,R) electronic DSX 26. Similarly, tip and ring conductors 22a and 32b are terminating on the tip and ring wire wrap pins of the $OUT_2$ pair (T,R).

3. Temporary Installation Of Temporary Circuit

To prevent signal distortion during installation of the electronic DSX 26, a temporary circuit, shown schematically at 34, is installed on the existing conductor pairs to be rerouted. The temporary circuit includes elements (schematically shown) to provide a resistively dropped signal carried through a bridging office repeater to regenerate low signal levels. It will be appreciated that such a circuit with such elements is well with the skill of the art.

Assuming that conductor pairs 16 and 18 are selected to be the first pair to be rerouted, temporary circuit 34 is connected to the transmit conductor pair 16. Temporary circuit 34 includes a pair 36 of IN conductors including an IN tip conductor 36a and an IN ring conductor 36b. Similarly, temporary circuit 34 includes a pair 38 of OUT conductors including an OUT tip conductor 38a and an OUT ring conductor 38b.

In the method of the present invention, IN conductor pair 36 is first connected to existing conductor pair 16 through the use of non-severing-type connectors which temporarily receive and retain conductors in fixed position prior to an electrical connection being made. The connector is preferably shiftable to a second position to effect electrical connection between the conductors held by the connector without severing either conductor. Such non-severing connectors are commercially available and form no part of this invention per se. A preferred example of such is sold by the 3M Corporation of St. Paul under the registered trademark UPB. For ease of discussion, such non-severing connectors will be referred to hereafter as UPB connectors.

Figure 9:
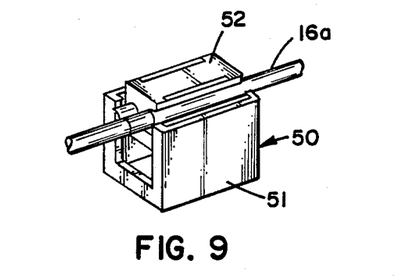
FIG. 9 is a perspective view of a non-severing type connector used in the method of the present invention with a through conductor placed in the connector in a non-locked position.
Figure 9A:
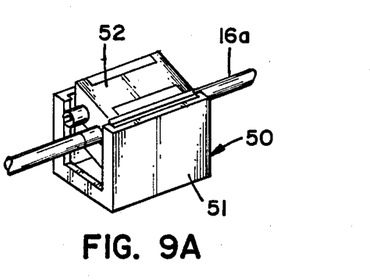
FIG. 9A is the connector of FIG. 9 shown in a first temporary locked position.
Figure 9B:
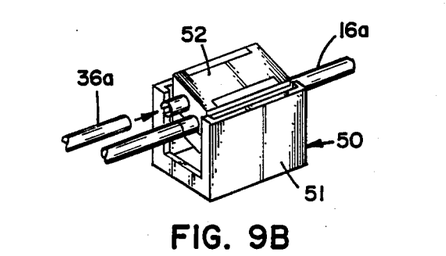
FIG. 9B is the connector of FIG. 9A showing a conductor positioned to be inserted into a second side of the connector.
Figure 9C:
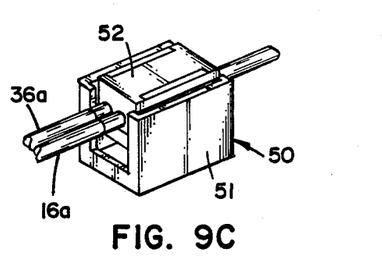
FIG. 9C is the connector of FIG. 9B shown in a second temporary locked position.
Figure 9D:
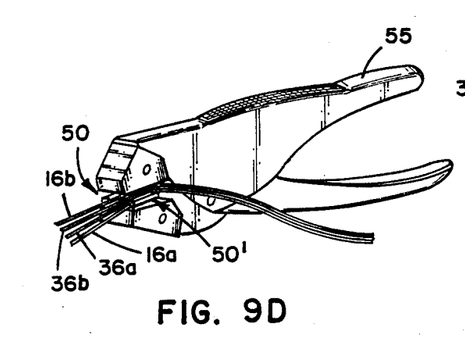
FIG. 9D shows two connectors of the type shown in FIG. 9C with the connectors placed between the jaws of a crimping tool.
Figure 9E:
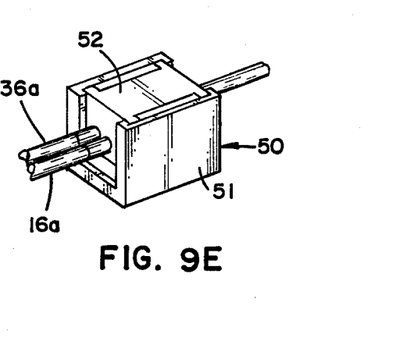
FIG. 9E shows the connector of FIG. 9C after crimping with the connector shown in a final locked position.
Figure 9F:
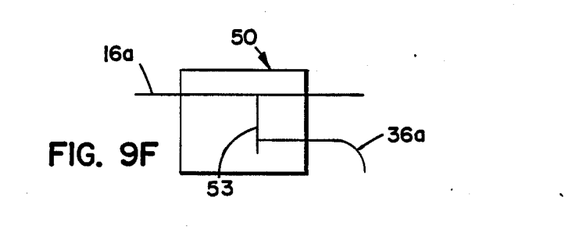
FIG. 9F schematically shows the connector of FIG. 9E.

For ease of illustration, a UPB connector 50 is shown in FIGS. 9–9F. The connector includes a body 51 and a cap 52. (As all UPB connectors described herein are identical, all are shown with the same reference numeral.)

Use of the UPB connector 50 includes placing existing tip conductor 16a in the through side of the UPB connector. Under finger pressure, this side of cap 52 is pressed down until the cap 52 snaps into a first temporary lock position as shown in FIG. 9A. In this position, the UPB connector is free to slide along conductor 16a. In the method of the present invention, a similar procedure is used to insert a UPB connector onto ring conductor 16b.

With the UPB connectors 50 installed in their temporary lock positions on conductors 16a and 16b, IN tip conductor 36a is inserted into the open side of the UPB connector as shown in FIG. 9B. Under finger pressure, an operator presses down on this side of the connector cap 52 until it snaps into a second temporary lock position as shown in FIG. 9C. Similarly, IN ring conductor 36b is inserted into UPB connector 50' which is snapped into a second temporary lock position. With both UPB connectors 50, 50' in the second temporary lock positions, the connectors are placed between the jaws of a crimping tool 55 (FIG. 9D) which is squeezed by an operator to simultaneously urge both UPB connectors 50, 50' into a final lock position with an electrical connection established between conductor pairs 16a, 36a and 16b, 36b within each UPB connector when in the final lock position.

FIG. 9E shows UPB connector 50 in a final lock position. FIG. 9F shows the schematic of the connector with an internal circuit element 53 causing electrical connection between conductors 16a, 36a.

OUT conductors 38a and 38b are connected to the existing conductor pair 16a and 16b by severing-type connectors 60. All severing-type connectors referred to herein are identical and therefore similarly numbered. Such connectors receive and hold conductors in temporary lock positions. The connectors are shifted to final lock positions. When so shifted, the connector effects electrical connection between the held conductors and severs excess amounts of the connectors. Such severing-type connectors are commercially available and form no part of this invention per se. A preferred example of such is marketed by the aforesaid 3M Corporation under the registered trademark 211 Trimlock. For convenience, all severing type connectors referred to hereafter will be identified simply as 211 Trimlock connectors.

Figure 10:
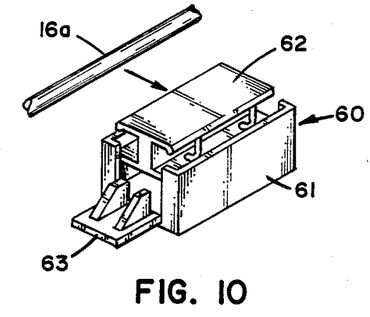
FIG. 10 is a perspective view of a severing-type connector for use in the method of the present invention with a first conductor shown being positioned to one side of the connector.
Figure 10A:
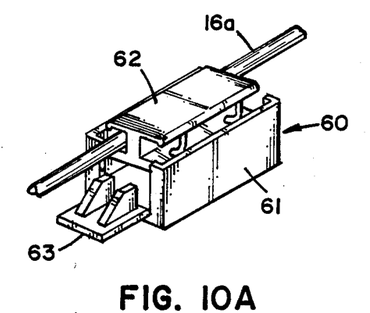
FIG. 10A is a view of the connector of FIG. 10 with the first conductor placed within the connector and with the connector in a first temporary locked position with the connector tab facing the side of the circuit to be severed.

In the method of the present invention, a 211 Trimlock connector 60 is first temporarily installed on line 16a as shown in FIGS. 10 and 10A. The 211 Trimlock connector 60 is disposed with its tab end towards the already connected UPB connector to create a cut of tip conductor 16a between the 211 Trimlock connector 60 and the already installed UPB connector 50. The 211 Trimlock connector is temporarily installed on line 16a by pressing the 211 Trimlock connector cap 62 into a first temporary lock position shown in FIG. 10A. In this position, the 211 Trimlock connector is free to slide along conductor 16a. Similar to the foregoing, a 211 Trimlock connector is installed on line 16b.

Figure 10B:
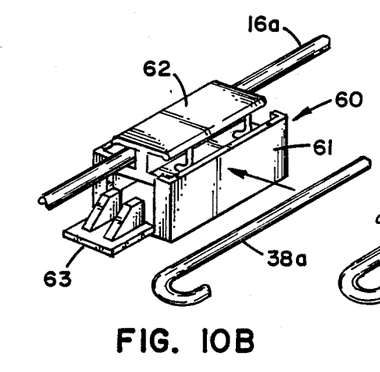
FIG. 10B is the connector of FIG. 10A with a second conductor shown positioned for insertion into a second side of the connector.
Figure 10C:
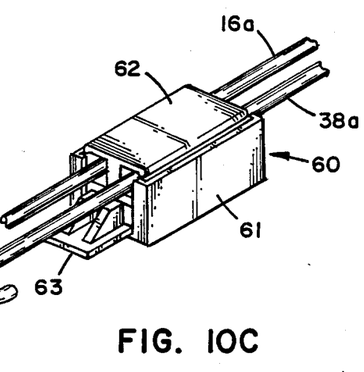
FIG. 10C is the connector of FIG. 10B with the second conductor placed within the connector and with the connector in a second temporary locked position.

OUT tip conductor 38a is installed on the other side of the connector as shown in FIGS. 10B and 10C (the free end of conductor 38a is hooked to facilitate insertion on the connector 60). This side of the connector cap 62 is pressed to a second temporary lock position as shown in FIG. 10C. Similarly, OUT ring conductor 38b is temporarily installed into 211 Trimlock connector 60' which will connect conductor 38b to conductor 16b.

Figure 10D:
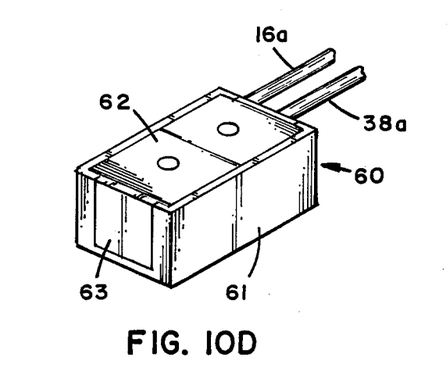
FIG. 10D is the connector of FIG. 10C shown in a final locked position.
Figure 10E:
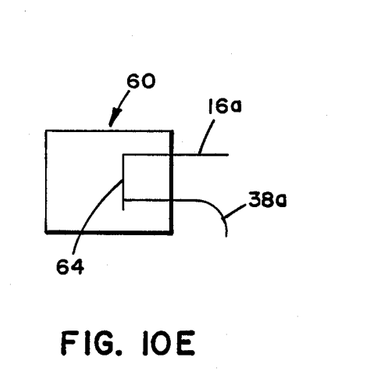
FIG. 10E is a schematic showing of the connector of FIG. 10D.
Figure 11:
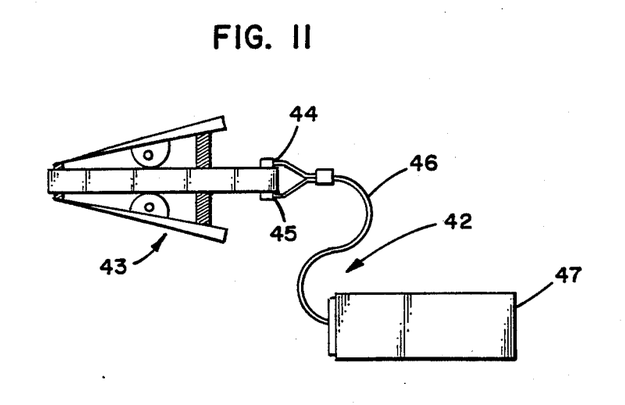
FIG. 11 is a view of an alligator clip attachment for use with the method of the present invention.

FIG. 2 is a schematic representation of the temporary circuit 34 with UPB connectors being installed to effect electrical connection and with the 211 Trimlock connectors being temporarily installed (in the second temporary fixed position of FIG. 10C) without electrical connection between conductor pairs 38 and 16 and with lines 16a and 16b intact. With the 211 Trimlock connectors so installed, the 211 Trimlock connectors are placed between the jaws of a crimping tool (such as the manner shown in FIG. 9D) and the operator crimps the connectors simultaneously so that both 211 Trimlock connectors are urged into their final lock position (shown in FIG. 10D). When urged into their final lock position, the 211 Trimlock connectors effect electrical connection between the conductors carried by the connector and severe conductors 16a and 16b as well as the excess of conductors 38a, 38b. Tab 63 covers the severed ends of the conductors as shown in FIG. 10D. FIG. 10E is schematic of FIG. 10D showing electrical connection completed by circuit element 64 carried by connector 60.

Figure 3:
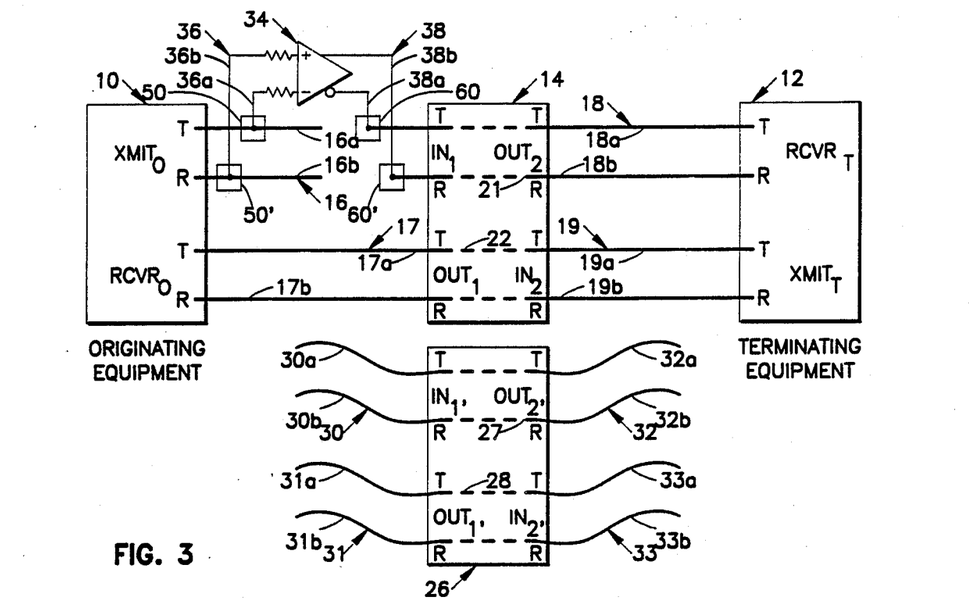
FIG. 3 is the view of FIG. 2 with a tip conductor and a ring conductor shown severed.

FIG. 3 is an electrical schematic showing the network after complete installation of the UPB and 211 Trimlock connectors. As shown in FIG. 3, conductors 16a and 16b are severed. The digital signal through the network is now routed through temporary circuit 34.

Figure 4:
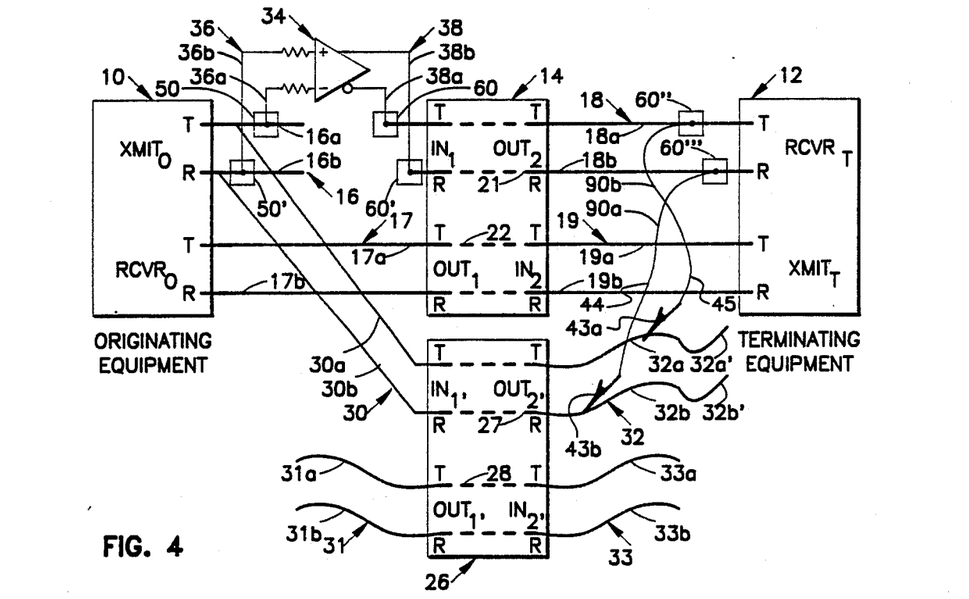
FIG. 4 is the view of FIG. 3 with the electronic DSX shown partially installed between the originating equipment and the terminating equipment.

4. Direct Connection Of First Replacement Conductor To Transmit Pair Of Originatinq Equipment In the method of the present invention, with the temporary circuit 34 installed as described, the first replacement conductor pair 30 is terminated onto the transmit wire wrap pins T,R of the originating equipment as shown in FIG. 4.

Figure 12:
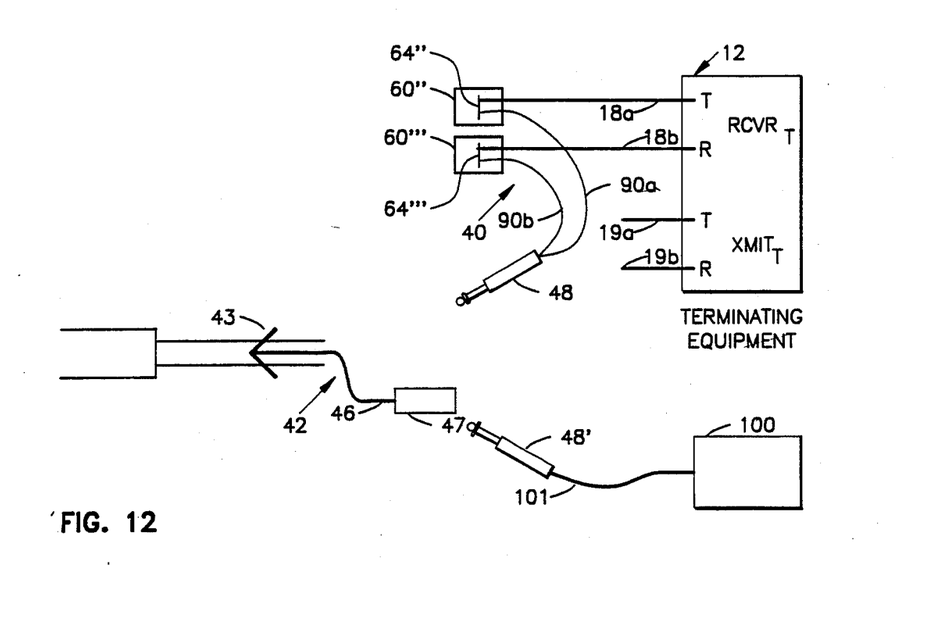
FIG. 12 shows a temporary circuit about to be completed using the clip of FIG. 11.

5. Temporary Connection Of Second Replacement Conductors To Receive Terminals Of Terminating Equipment An alligator clip 43 is selected to be attached to a cable (which carries conductors 32a and 32b) as shown in FIG. 12. The clip 43 pierces the insulation of the conductors 32a and 32b to make electrical contact with the conductors. Upon removal of the alligator clip 43, the insulation which has been pierced resiliently resumes its original position. An example of such is a B Transfer Clip sold by General Machine Products of Trevose, Pa. The alligator clip has a pair of conductors (tip 44 and ring 45) carried by a cable 46 which terminate at a female connector 47 with conductor 44 terminating on the tip lead and connector 45 terminating on the ring lead. Leads are marked on commercially available clips 43 as "T" and "R". In FIGS. 4-14 6, the leads are shown as tip lead 43a and ring lead 45b. It will be appreciated that clips such as alligator clip 43 are commercially available and form no part of this invention per se.

FIG. 12 shows an alligator clip 43 attached to tip and ring conductors. The conductors are carried in a common cable sheathing which is trimmed. The clip is attached to the exposed conductors.

Patchcord 40 includes a male connector 48 (preferably a ¼" telephone plug) selected to mate with female connector 47 (preferably a ¼" telephone jack). A pair of temporary tip and ring conductors (90a and 90b, respectively) extend from the male connector 48.

To test the installed electronic DSX, a testing devise 100 is provided. Preferably, testing device 100 is a Series 2000 as sold by ADC Telecommunications of Minneapolis, Minn. The equipment permits testing of the electronic DSX 26 and the circuit through the transmit pair of the originating equipment. A cable 101 connects the testing device to a male connector 48'.

With the alligator clip 43 attached, the digital line may be tested by inserting the connector 48' into female connector 47. The circuit installed thus far may be tested by test equipment 100. When testing is completed, the connector 48' is removed. Second replacement conductor pair 32 is temporarily connected to the tip and ring receiving pair (RCVR T,R) of the terminating equipment 12 via a temporary patchcord 40 and alligator clip adaptor 42.

Next patchcord 40 is connected by inserted plug 48 into connector 47. Each of conductors 90a and 90b are connected to conductors 18a, 18b, respectively, by severing-type connectors 60'', 60''' such as the 211 Trimlock connector previously described. FIG. 4 shows the 211 Trimlock connectors 60'', 60''' temporarily in place on conductors 18a and 18b with conductors 44 and 45 installed and with the 211 Trimlock connectors 60'', 60''' in their first temporary position without electrical connection established across the connectors. The 211 Trimlock connectors 60'', 60''' are disposed so when urged into their locked position, the connectors terminate conductors 18a and 18b on the sides of the 211 Trimlock connectors 60'', 60''' with the tabs facing the manual DSX 14. With 211 Trimlock 60'', 60''' connectors in their temporary locked position, the 211 Trimlock 60'', 60''' connectors are both received between the jaws of the crimping tool. The jaws are urged together by the operator to simultaneously urge both of the 211 Trimlock 60'', 60''' connectors to their final locked position. This terminates conductors 18a and 18b and simultaneously cause electrical connection between conductors 18a, 90a and conductors 18b and 90b, respectively.

Figure 5:
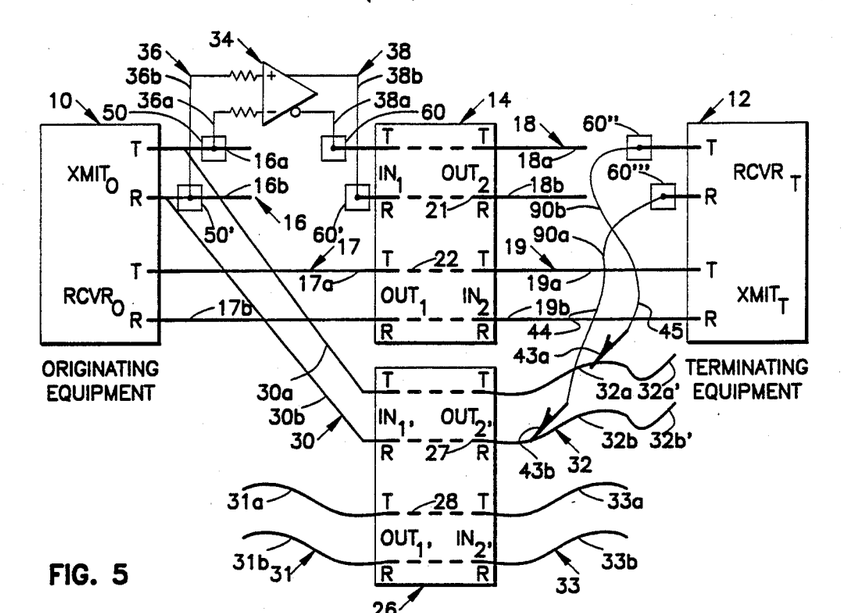
FIG. 5 is the view of FIG. 4 showing a tip conductor and a ring conductor severed.

With the 211 Trimlock connectors 60'', 60''' in their final locked position, the existing digital path across original conductor pair 16 and 18 has been rerouted through the electronic DSX 26. FIG. 5 shows electrical schematic of the network with the Trimlock connectors in their locked position and with conductors 18a and 18b being severed.

Figure 6:
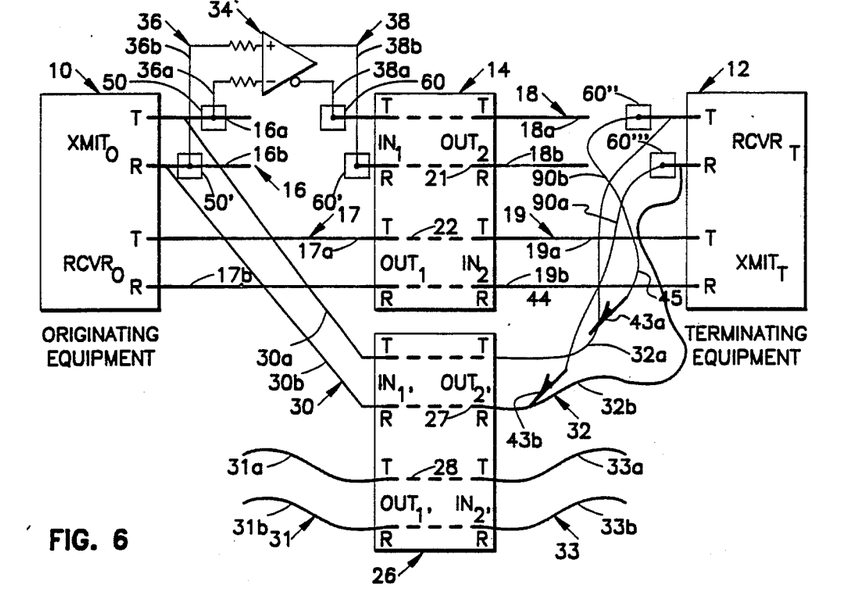
FIG. 6 is the view of FIG. 5 with conductors from the electronic DSX being directly connected to the terminating equipment.
Figure 7:
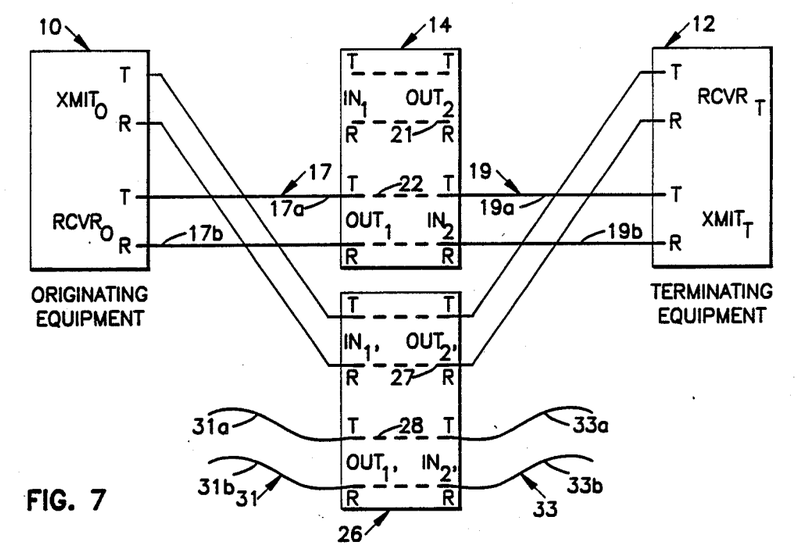
FIG. 7 is the view of FIG. 6 showing the temporary patch removed with a signal pathway completely wired connecting the electronic DSX with the originating equipment and the terminating equipment.

6. Direct Connection Of Second Replacement Conductor To Terminating Equipment As shown in FIG. 5, alligator clip 43 is positioned on conductors 32a and 32b with clip 43 spaced from free ends 32a' and 32b'. After the 211 Trimlock connectors 60'', 60''' sever lines 18a and 18b, free ends 32a' and 32b' are directly connected to the tip and ring wire wrap post (RCVR T,R) of terminating equipment 12. This connection is schematically shown in FIG. 6. When the connection schematically shown in FIG. 6 is completed, the alligator clip 43 is removed from the second replacement conductor pair 32 and the patchcord 40 as well as the temporary circuit 34 and the remaining portions of conductor pairs 16 and 18 may be physically removed from the network. This arrangement is schematically shown in FIG. 7. As shown in FIG. 7, the transmit line from the originating equipment 10 to the terminating equipment 12 has now been effectively rerouted through the electronic DSX. All conductor pairs originating at transmit lines (XMIT) on the originating equipment 10 may be rerouted as described above.

Figure 8:
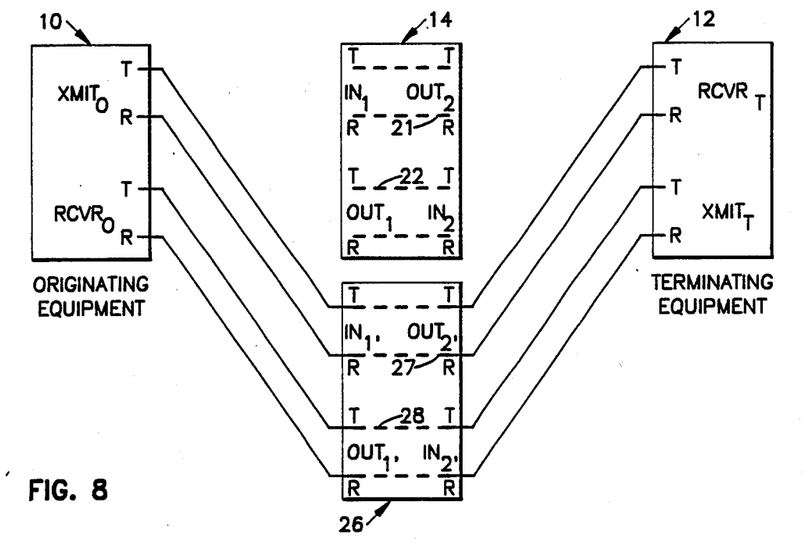
FIG. 8. is the view of FIG. 7 with the electronic DSX being completely wired between the originating and terminating equipment and with the manual DSX being shown disconnected from the network.

The transmit lines from the terminating equipment to the originating equipment (such as that through conductor pairs 19 and 17) can be rerouted through the electronic DSX similar to that described above. In effecting this rerouting, a high impedance circuit is attached to conductor pair 19 in a manner similar to that in which the temporary circuit 34 was connected to conductor pair 16. With the high impedance circuit connected to conductor pair 19, the alligator clips and patchcord 40 temporarily connect a replacement cable to cable 17 following which, the replacement cable is directly wired to the wire wrap pins (T,R) of the originating equipment. This completed circuit is shown in FIG. 8. As shown in FIG. 8, the manual DSX 14 is now completely isolated from the network and the electronic DSX 26 is completely installed.

Having described the method of the present invention in detail, the advantages of the present invention will now be apparent. Namely, data transmission flows between the originating equipment 10 and the terminating equipment 12 at all times. It is never interrupted. The connection of the temporary circuit 34 to the existing transmitting cables (such as conductor pair 16 or 19) creates a parallel pathway which does not distort the signal. When the electronic DSX 26 is electrically connected between the originating and terminating equipment 10, 12 (by locking the 211 Trimlock connectors 60'', 60''') the impedance difference between the temporary circuit and that of the network through the electronic DSX causes signal flow through the electronic DSX automatically. The use of the patchcord 40 with the patchcord adaptor 42 permits the electronic DSX to be connected to the transmitting equipment with the circuit readily testable through use of the Series 2000 test equipment 100. As a result, this circuit can be tested before final connection to the terminating equipment. With the present method, there is no circuit down time and no auxiliary connectors are left after changeover has been completed.

From the foregoing detailed description of the present invention, it has been shown how the objects of the invention have been attained in a preferred manner. However, modifications and equivalents of the disclosed concepts such as readily occur to those skilled in the art are intended to be included in the scope of this invention. Thus, the scope of the invention is intended to be limited only by the scope of the claims as are, or may hereafter be, appended hereto.

What is claimed is:

1. In a telecommunications network having at least first and second original equipment connected by at least a first original conductor, a method for adding an additional equipment to said network with said additional equipment connected to said first original equipment by at least a first replacement conductor and said additional equipment connected to said second original equipment by at least a second replacement conductor, said method carried out using a temporary circuit having at least first and second temporary conductors, said method comprising the steps:
   electrically connecting said first and second replacement conductors to said additional equipment;
   electrically connecting said first temporary conductor to said original conductor at a first point of connection;

electrically connecting said second temporary conductor to said original conductor at a second point of connection, said second point of connection disposed between said second original equipment and said first point of connection, said first and second temporary conductors and at least a portion of said first original conductor cooperating to define a temporary signal pathway between said first and second original equipment with said temporary signal pathway including said temporary circuit;

severing said original conductor at a point of severance disposed between said first and second points of connection;

electrically connecting said first replacement conductor to said first original equipment;

electrically connecting said second replacement conductor to said second original equipment; and severing said temporary signal pathway.

2. In a telecommunications network having at least first and second original equipment connected by at least a first original conductor, a method for adding an additional equipment to said network with said additional equipment connected to said first original equipment by at least a first replacement conductor and said additional equipment connected to said second original equipment by at least a second replacement conductor, said method carried out using a temporary circuit having at least first and second temporary conductors and further carried out using a third temporary conductor having means for connecting said third temporary conductor to said second replacement conductor, the method comprising the steps of:

electrically connecting said first and second replacement conductors to said additional equipment;

electrically connecting said first temporary conductor to said original conductor at a first point of connection;

electrically connecting said second temporary conductor to said original conductor at a second point of connection, said second point disposed between said second original equipment and said first point of connection, said first and second temporary conductors and at least a portion of said first original conductor cooperating to define a temporary signal pathway between said first and second original equipment with said temporary signal pathway including said temporary circuit;

severing said original conductor at a point of severance disposed between said first and second points of connection;

electrically connecting said first replacement conductor to said first original equipment;

electrically connecting said third temporary conductor to said second replacement conductor;

electrically connecting said third temporary conductor to said original conductor at a third point of connection disposed intermediate said second point of connection and said second original equipment;

severing said temporary signal pathway at a second point of severance disposed between said third point of connection and said first original equipment;

electrically connecting said second replacement conductor to said second original equipment to form a direct signal pathway between said second replacement conductor and said second original equipment without said direct signal pathway including said third temporary conductor; and removing said third temporary conductor.

3. The method according to claims 1 or 2 wherein said first temporary conductor is electrically connected to said original conductor with non-severing electrical connector means having at least first and second states, said connector in said first state holding said first temporary conductor and said original conductor in desired alignment without electrical connection between said conductors and, in said second state, said connector effecting electrical connection between said first temporary conductor and said original conductor without severing said original conductor, said method including the step of electrically connecting said first temporary conductor to said original conductor by holding said first temporary conductor and said original conductor in said alignment within said non-severing connector and shifting said connector to said second state.

4. The method according to claim 3 wherein said first original conductor is one of a pair of first tip and ring conductors, said first temporary conductor is one of a pair of first temporary tip and ring conductors, said non-severing connector including a first non-severing connector for electrically connecting said first original tip conductor to said first temporary tip conductor and a second non-severing connector for electrically connecting said first original ring conductor with said first temporary ring conductor, the method including the step of connecting said first temporary conductors to said second original conductors by near simultaneously shifting said connectors from said first state to said second state.

5. The method according to claim 2 wherein said second temporary conductor is connected to said original conductor by a severing-type connector means having means to receive said existing connector and said temporary connector when in a first state and to electrically connect said conductors when shifted to a second state, said connector means severing said original conductor when said connector means is shifted to said second state, the method including the step of electrically connecting said second temporary conductor to said original conductor by holding said second temporary conductor and said original conductor in said severing-type connector means in said first state and shifting said connector means to said second state to electrically connect said conductors and to sever said original conductor.

6. The method according to claim 5 wherein said original conductor is one of a pair of tip and ring conductors and said second temporary conductor is one of a pair of tip and ring conductors, said severing-type connector means including a severing-type connector for connecting the tip conductors and a severing-type connector for connecting the ring conductors, said method including the step of simultaneously shifting said severing-type connectors from said first state to said second state.

7. The method according to claim 6 wherein said third temporary conductor includes a third pair of tip and ring conductors, said method including the use of third severing-type connectors, the method including the steps of positioning severing-type connectors in first state to hold in paired alignment the tip and ring connectors of said original pair and said third temporary pair and shifting said severing-type connectors from said first state to said second state to electrically connect said pairs and terminate said conductors of said original pair.

8. The method according to claim 2 wherein said third temporary conductor includes means for test accessing a signal passing through said third conductor.

9. The method according to claim 2 wherein said network includes a third original equipment disposed between said first and second original equipment, the method including the step whereby said first and second points of connection are disposed on opposite sides of said third original equipment.

10. In a telecommunications network having at least first, second and third original equipment connected in series by at least a first original conductor including a first segment connecting said first and third original equipment and a second segment connecting said second and third original equipment, a method for replacing said third original equipment with an additional equipment to be connected to said first original equipment by at least a first replacement conductor and said additional equipment to be connected to said second original equipment by said second replacement conductor, said method carried out using a temporary circuit having at least first and second temporary conductors and further carried out using a third temporary conductor having means for connecting said third temporary conductor to said second replacement conductor, the method comprising the steps of:

electrically connecting said first and second replacement conductors to said additional equipment;

electrically connecting said first temporary conductor to said first segment at a first point of connection;

electrically connecting said second temporary conductor to said first segment at a second point of connector, said second point disposed between said first point and said third original equipment, said first and second temporary conductors and said second segment cooperating to define a temporary signal pathway between said first and second original equipment with said temporary signal pathway including said temporary circuit;

severing said first segment at a point of severance disposed between said first and second points of connection;

electrically connecting said first replacement conductor to said first original equipment;

electrically connecting said third temporary conductor to said second replacement conductor;

electrically connecting said third temporary conductor to said second segment at a third point of connecting severing said temporary signal pathway at a point of severance between said third point of connection and said first original equipment;

electrically connecting said second replacement conductor to said second original equipment to form a signal pathway between said second replacement conductor and said second original equipment without said pathway including said third temporary conductor; and removing said third temporary conductor.

11. The method according to claim 1 wherein said second temporary conductor is connected to said original conductor by a severing-type connector means having means to receive said existing connector and said temporary connector when in a first state and to electrically connect said conductors when shifted to a second state, said connector means severing said original conductor when said connector means is shifted to said second state, the method including the step of electrically connecting said second temporary conductor to said original conductor by holding said second temporary conductor and said original conductor in said severing-type connector means in said first state and shifting said connector means to said second state to electrically connect said conductors and to sever said original conductor.

12. The method according to claim 11 wherein said original conductor is one of a pair of tip and ring conductors and said second temporary conductor is one of a pair of tip and ring conductors, said severing-type connector means including a severing-type connector for connecting the tip conductors and s severing-type connector for connecting the ring connectors, said method including the step of simultaneously shifting said severing-type connectors from said first state to said second state.

* * * * *

UNITED STATES PATENT AND TRADEMARK OFFICE
CERTIFICATE OF CORRECTION

PATENT NO. : 4,941,165

DATED : July 10, 1990

INVENTOR(S) : Kevin A. Rademacher, et al.

It is certified that error appears in the above-identified patent and that said Letters Patent is hereby corrected as shown below:

Column 6, Line 55, "4-146," should read -- 4-6, --.

Column 6, Line 56, "45b" should read -- 43b --.

Column 12, Line 40, delete "s" after the word "and".

Signed and Sealed this

Thirty-first Day of March, 1992

*Attest:*

HARRY F. MANBECK, JR.

*Attesting Officer*   *Commissioner of Patents and Trademarks*